US011961483B2

(12) United States Patent
Xiong et al.

(10) Patent No.: US 11,961,483 B2
(45) Date of Patent: Apr. 16, 2024

(54) DISPLAY PANEL AND DISPLAY DEVICE

(71) Applicant: Shanghai Tianma Micro-Electronics Co., Ltd., Shanghai (CN)

(72) Inventors: Nana Xiong, Shanghai (CN); Jujian Fu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/308,140

(22) Filed: Apr. 27, 2023

(65) Prior Publication Data

US 2023/0260469 A1 Aug. 17, 2023

Related U.S. Application Data

(63) Continuation of application No. 17/565,255, filed on Dec. 29, 2021, now Pat. No. 11,670,246, which is a (Continued)

(30) Foreign Application Priority Data

Mar. 1, 2021 (CN) .......................... 202110226111.4

(51) Int. Cl.
*G09G 3/3291* (2016.01)

(52) U.S. Cl.
CPC ....... *G09G 3/3291* (2013.01); *G09G 2300/08* (2013.01); *G09G 2310/065* (2013.01)

(58) Field of Classification Search
CPC ............. G09G 3/3291; G09G 2300/08; G09G 2310/065
See application file for complete search history.

(56) References Cited

U.S. PATENT DOCUMENTS

2007/0063932 A1 3/2007 Nathan et al.
2014/0062843 A1 3/2014 Yang et al.
(Continued)

FOREIGN PATENT DOCUMENTS

CN 112102778 A 12/2020
CN 112133242 A 12/2020

OTHER PUBLICATIONS

First Office Action, Chinese Patent Application No. 202110226111.4, dated Nov. 9, 2021, 26 pages.

*Primary Examiner* — Priyank J Shah
(74) *Attorney, Agent, or Firm* — CHRISTENSEN O'CONNOR JOHNSON KINDNESS PLLC

(57) ABSTRACT

A display panel includes at least one pixel circuit and a light emitting element. One pixel circuit includes a driving transistor, and second and third transistors. The second transistor is connected between data line and a source of the driving transistor. The third transistor is connected between voltage adjusting signal line and the source. During a data writing phase, the second transistor is turned on, the data line provides data signal equal to VData to the source, a gate of the driving transistor receives the data signal, and voltage of the gate is VData+Vth. Vth denotes threshold voltage of the driving transistor. During a reset and adjustment phase, the third transistor is turned on, the voltage adjusting signal line provides adjusting voltage to the source, voltage of the source of the driving transistor is VJ, and the voltage of the gate remains VData+Vth. VData+Vth−VJ≤−2V.

20 Claims, 11 Drawing Sheets

Related U.S. Application Data continuation of application No. 17/332,222, filed on May 27, 2021, now Pat. No. 11,250,790.

(56) References Cited

U.S. PATENT DOCUMENTS

| | | | | |
|---|---|---|---|---|
| 2016/0078806 | A1* | 3/2016 | Lim | G09G 3/3275 345/212 |
| 2019/0096330 | A1 | 3/2019 | Kim et al. | |
| 2021/0049959 | A1 | 2/2021 | Park et al. | |
| 2021/0082348 | A1 | 3/2021 | Kawashima et al. | |
| 2021/0118368 | A1 | 4/2021 | In et al. | |
| 2021/0383743 | A1 | 12/2021 | Yuan | |

* cited by examiner

DISPLAY PANEL AND DISPLAY DEVICE

CROSS-REFERENCE TO RELATED APPLICATIONS

The present application is a continuation of U.S. patent application Ser. No. 17/565,255, filed on Dec. 29, 2021, which is a continuation of U.S. patent application Ser. No. 17/332,222, filed on May 27, 2021, which claims priority to Chinese Patent Application No. 202110226111.4, filed on, Mar. 1, 2021. All of the above-mentioned patent applications are hereby incorporated by reference in their entireties.

TECHNICAL FIELD

The present application relates to the field of display technology, and particularly, to a display panel and a display device.

BACKGROUND

Organic Light-Emitting Diode (OLED) has certain advantages, such as low power consumption, low cost, self-luminescence, wide viewing angle, and fast response speed, and thus has become one of the current research hotspots in the display field. Different refresh rates are used by electronic products for displaying in different application scenarios, for example, a driving method with a higher refresh rate is used for driving the displaying of dynamic images (such as sports events or game scenes) to ensure the smoothness of display images; and a driving method with a lower refresh rate is used for driving the displaying of slow-motion images or static images to reduce power consumption. However, electronic products using organic self-luminous technology can encounter screen flicker phenomenon when displaying slow-motion images or static images, which affects the visual experience.

SUMMARY

In a first aspect, an embodiment of the present disclosure provides a display panel. The display panel includes at least one pixel circuit and a light emitting element. One pixel circuit of the at least one pixel circuit includes a driving transistor, a second transistor, and a third transistor. The second transistor is connected between a data line and a source of the driving transistor, and the third transistor is connected between a voltage adjusting signal line and the source of the driving transistor. An operation process of the display panel includes a data writing phase and a reset and adjustment phase. During the data writing phase, the second transistor is turned on, the data line is configured to provide a data signal to the source of the driving transistor, the data signal is VData, a gate of the driving transistor is configured to receive the data signal, and a voltage of the gate of the driving transistor is VData+Vth, where Vth denotes a threshold voltage of the driving transistor. During the reset and adjustment phase, the third transistor is turned on, the voltage adjusting signal line is configured to provide an adjusting voltage to the source of the driving transistor, a voltage of the source of the driving transistor is VJ, and the voltage of the gate of the driving transistor remains VData+Vth. VData+Vth−VJ≤−2V.

In a second aspect, an embodiment of the present disclosure provides a display panel. The display panel includes at least one pixel circuit and a light emitting element. One pixel circuit of the at least one pixel circuit includes a driving transistor, a second transistor, and a third transistor. The second transistor is configured to provide a data signal to a source of the driving transistor, and the third transistor is configured to provide an adjusting voltage to the source of the driving transistor. An operation process of the display panel includes a data writing phase and a reset and adjustment phase. During the data writing phase, the second transistor is turned on, a data signal is VData, a data line is configured to provide the data signal to the source of the driving transistor, a gate of the driving transistor is configured to receive the data signal, and a voltage of the gate of the driving transistor is VData+Vth, where Vth denotes a threshold voltage of the driving transistor. During the reset and adjustment phase, the third transistor is turned on, a voltage adjusting signal line is configured to provide the adjusting voltage to the source of the driving transistor, the adjusting voltage is VJ, a voltage of the source of the driving transistor is VJ, and the voltage of the gate of the driving transistor remains VData+Vth. VData+Vth−VJ≤−2V.

In a third aspect, an embodiment of the present disclosure provides a display device including a display panel. The display panel includes at least one pixel circuit and a light emitting element. One pixel circuit of the at least one pixel circuit includes a driving transistor, a second transistor, and a third transistor. The second transistor is connected between a data line and a source of the driving transistor, and the third transistor is connected between a voltage adjusting signal line and the source of the driving transistor. An operation process of the display panel includes a data writing phase and a reset and adjustment phase. During the data writing phase, the second transistor is turned on, the data line is configured to provide a data signal to the source of the driving transistor, a gate of the driving transistor is configured to receive the data signal that is VData, and a voltage of the gate of the driving transistor that is Vg2 is VData+Vth, where Vth denotes a threshold voltage of the driving transistor. During the reset and adjustment phase, the third transistor is turned on, the voltage adjusting signal line is configured to provide an adjusting voltage to the source of the driving transistor, a voltage of the source of the driving transistor that is Vs2 is VJ, and the voltage of the gate of the driving transistor that is Vg2 remains VData+Vth. VData+Vth−VJ≤−2V.

In a fourth aspect, an embodiment of the present disclosure provides a display device including a display panel. The display panel includes at least one pixel circuit and a light emitting element. One pixel circuit of the at least one pixel circuit includes a driving transistor, a second transistor, and a third transistor. The second transistor is configured to provide a data signal to a source of the driving transistor, and the third transistor is configured to provide an adjusting voltage to the source of the driving transistor. An operation process of the display panel includes a data writing phase and a reset and adjustment phase. During the data writing phase, the second transistor is turned on, a data line is configured to provide a data signal to the source of the driving transistor, a gate of the driving transistor is configured to receive the data signal that is VData, and a voltage of the gate of the driving transistor that is Vg2 is VData+Vth, where Vth denotes a threshold voltage of the driving transistor. During the reset and adjustment phase, the third transistor is turned on, a voltage adjusting signal line is configured to provide an adjusting voltage to the source of the driving transistor, a voltage of the source of the driving transistor that is Vs2 is VJ, and the voltage of the gate of the driving transistor that is Vg2 remains VData+Vth. VData+Vth−VJ≤−2V.

BRIEF DESCRIPTION OF DRAWINGS

In order to more clearly explain technical solutions of embodiments of the present disclosure or the related art, the drawings needed in the description of the embodiments or the related art are briefly described as below. The drawings described below are merely some of the embodiments of the present disclosure. Those skilled in the art can also obtain other drawings based on these drawings.

DESCRIPTION OF EMBODIMENTS

Figure 1:
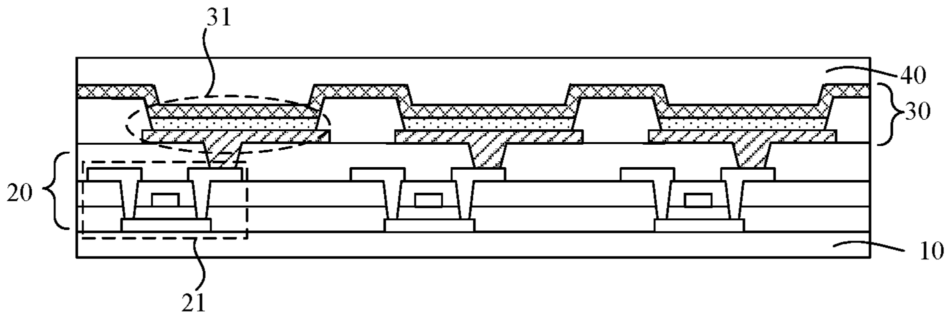
FIG. 1 is a sectional view of a display panel according to an embodiment of the present disclosure.

In order to make the objectives, technical solutions, and advantages of the present disclosure more clearly, the technical solutions of the present disclosure will be further described by embodiments with reference to the accompanying drawings. The described embodiments are some embodiments of the present disclosure, but not all of the embodiments. Other embodiments obtained by those persons skilled in the art based on the embodiments of the present disclosure shall fall within the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless the context indicates its meaning clearly.

The present disclosure provides a display panel, a method for driving the display panel, and a display device. The display panel includes a pixel circuit and a light emitting element. The pixel circuit is electrically connected to the light emitting element to drive the light emitting element to emit light, and thus the display panel displays screen images. When one frame of image is displayed, under control of a light-emission controlling signal, the pixel circuit supplies a driving current to the light emitting element to control the light emitting element to emit light. The beginning of the light emitting period of the light emitting element includes a light brightness rising process, and the brightness rising rate is affected by the bias state of the driving transistor. In the related art, the bias states of the driving transistor in two adjacent frames are significantly different, so the brightness rising rates are significantly different, which in turn leads to flicker in the display images. In the present disclosure, the operation process of driving the display panel includes a period of a data writing frame and a period of a holding frame. A data signal is written to a source of a driving transistor in the period of the data writing phase of the data writing frame, and the driving transistor is controlled to be in a biased state in the light emitting state to generate a driving current. In a reset and adjustment phase of the period of the holding frame, an adjusting voltage is written to a first terminal (source) of the driving transistor to adjust the bias state of the driving transistor. By providing the reset and adjustment phase in the period of the holding frame, the difference between the bias state of the driving transistor in the period of the holding frame and the bias state of the driving transistor in the period of the data writing frame is reduced, and thus the difference between a brightness rising rate of the light emitting element at the beginning of the period of the holding frame and a brightness rising rate of the light emitting element at the beginning of the period of the data writing frame is reduced, thereby reducing the flicker phenomenon of the display images. The present disclosure will be described in detail with specific embodiments below.

Figure 2:
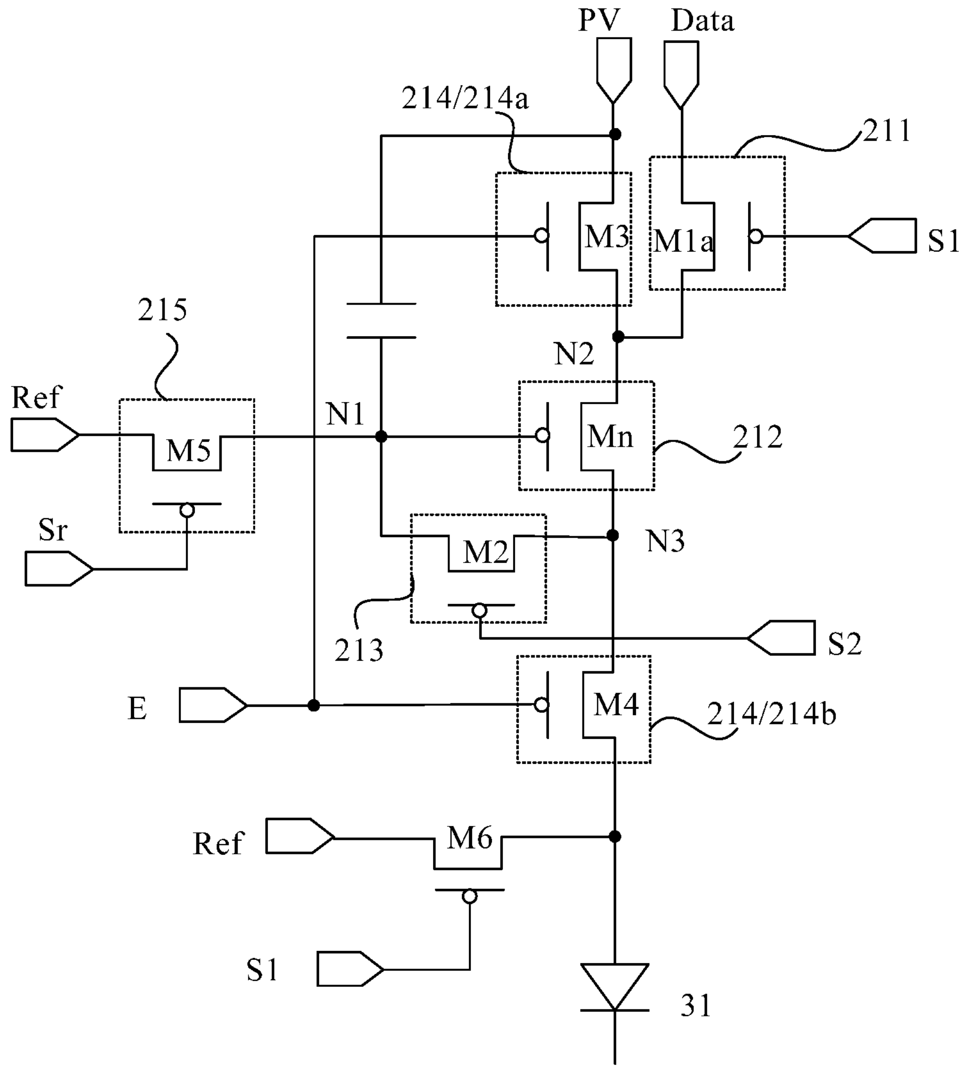
FIG. 2 is a schematic diagram of a pixel circuit of a display panel according to an embodiment of the present disclosure.
Figure 3:
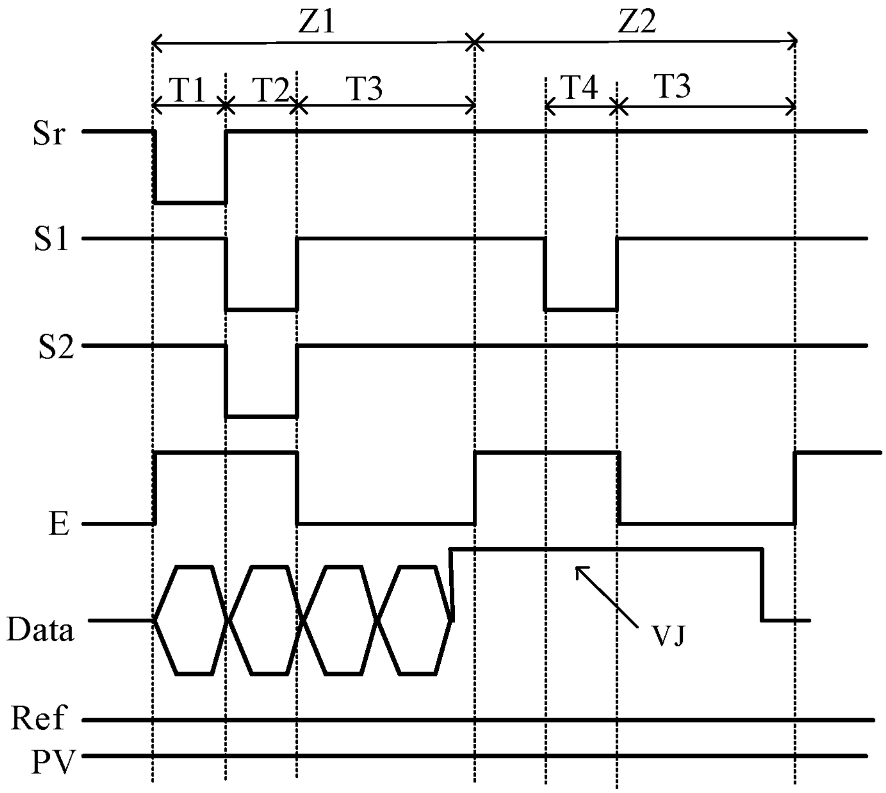
FIG. 3 is a timing sequence diagram of a pixel circuit in the display panel according to an embodiment of the present disclosure.

FIG. 1 is a sectional view of a display panel according to an embodiment of the present disclosure. FIG. 2 is a schematic diagram of a pixel circuit in the display panel according to an embodiment of the present disclosure. FIG. 3 is a timing sequence diagram of the pixel circuit in the display panel according to an embodiment of the present disclosure.

As shown in FIG. 1, a display panel includes a substrate 10, an array layer 20, and a display layer 30, and the array layer 20 and the display layer 30 are disposed on the substrate 10. The display layer 30 includes a plurality of light emitting elements 31. Specifically, the light emitting element 31 can include an organic light emitting diode, or the light emitting element 31 can include an inorganic light emitting diode. The array layer 20 includes pixel circuits 21. The pixel circuit 21 is electrically connected to the light emitting element 31. Specifically, the light emitting element 31 includes a first electrode, a light emitting layer, and a second electrode that are stacked. In an embodiment, the first electrode is a reflective anode, and the second electrode is a transparent cathode. In addition, an encapsulation structure 40 is further provided on a side of the display layer 30 facing away from the array layer 20. The encapsulation structure 40 is configured to encapsulate and protect the light emitting element 31, so as to ensure the service life of the light emitting element 31.

The structure of the pixel circuit 21 can be referred to the schematic diagram in FIG. 2. The pixel circuit includes a data writing module 211, a driving module 212, and a compensation module 213. The data writing module 211 is configured to provide a data signal and an adjusting voltage. The driving module 212 is configured to provide a driving current to the light emitting element 31. The driving module 212 includes a driving transistor Mn. The compensation module 213 is configured to compensate the threshold voltage of the driving transistor Mn.

As shown in FIG. 2, a gate of the driving transistor Mn is connected to a first node N1 of the pixel circuit, a source of the driving transistor Mn is connected to a second node N2, and a drain of the driving transistor Mn is connected to a third node N3. The data writing module 211 is connected to the source of the driving transistor Mn. The compensation module 213 is connected between the gate of the driving transistor Mn and the drain of the driving transistor Mn. The pixel circuit further includes a light-emission controlling module 214 and a reset module 215. The light-emission controlling module 214 is configured to control the driving transistor Mn to supply the driving current to the light emitting element 31, and thus the light emitting element 31 is controlled to emit light in the light emitting phase. The reset module 215 is configured to provide a reset signal to the gate of the driving transistor Mn.

In an embodiment, a control terminal of the data writing module 211 is electrically connected to a first control signal terminal S1, a first terminal of the data writing module 211 is electrically connected to a data signal input terminal Data, and a second terminal of the data writing module 211 is connected to the source of the driving transistor Mn. A control terminal of the compensation module 213 is electrically connected to a second control signal terminal S2, a first terminal of the compensation module 213 is electrically connected to the source of the driving transistor Mn, and a second terminal of the compensation module 213 is electrically connected to the drain of the driving transistor Mn. The light-emission controlling module 214, the driving transistor Mn, and the light emitting element 31 are connected in series. A control terminal of the light-emission controlling module 214 is electrically connected to a light-emission controlling signal terminal E, and a terminal of the light-emission controlling module 214 is electrically connected to a first power supply terminal PV. A control signal of the reset module 215 is electrically connected to a reset controlling signal terminal Sr, a first terminal of the reset module 215 is electrically connected to a reset signal terminal Ref, and a second terminal of the reset module 215 is electrically connected to the gate of the driving transistor Mn.

In an embodiment, the pixel circuit 21 further includes an anode reset transistor M6 configured to provide a reset signal to an anode (e.g., the reflective anode) of the light emitting element 31. The anode reset transistor M6 includes a first terminal electrically connected to a reset voltage input terminal Ref, a second terminal electrically connected to the anode of the light emitting element 31, and a gate electrically connected to the first control signal terminal S1.

With reference to the timing sequence diagram shown in FIG. 3, the operating process of the display panel includes a period Z1 of a data writing frame and a period Z2 of a holding frame.

In the period Z1 of the data writing frame, the pixel circuit executes a reset phase T1, a data writing phase T2, and a light emitting phase T3. The reset phase T1 is prior to the data writing phase T2. In the reset phase T1, the reset module 215 is turned on to reset the gate of the driving transistor Mn. Specifically, the reset module 215 is turned on under the control of a signal of a reset control signal terminal Sr, and supplies the signal of the reset signal terminal Ref to the gate of the driving transistor Mn to reset the gate of the driving transistor Mn, such that when the display panel executes the period Z1 of the data writing frame, the accurate data voltage can be written to the gate of the driving transistor. During the data writing phase T2, the data writing module 211 and the compensation module 213 are turned on, the data signal is written to the gate of the driving transistor Mn, and the compensation module 213 compensates the threshold voltage of the driving transistor Mn. Specifically, the data writing module 211 is turned on under control of the signal of the first control signal terminal S1 and writes the signal provided by the data signal input terminal Data to the source of the driving transistor Mn, the compensation module 213 is turned on under control of the signal of the second control signal terminal S2 and supplies the voltage of the drain of the driving transistor Mn to the gate of the driving transistor Mn, and the anode reset transistor M6 is turned on under control of the first control signal terminal S1 and then provides the reset signal to the anode of the light emitting element 31. During the light emitting phase T3, the light-emission controlling module 214 is turned on under the control of the light-emission control signal terminal E, and supplies the driving current generated by the driving transistor Mn to the light emitting element 31.

In the period Z2 of the holding frame, the pixel circuit executes a reset and adjustment phase T4 and the light emitting phase T3. During the reset and adjustment phase T4, the data writing module 211 is turned on, the compensation module 213 is turned off, the data writing module 211 writes the adjusting voltage for adjusting the bias state of the driving transistor Mn. Specifically, the data writing module 211 is turned on under the control of the signal of the first control signal terminal S1 and writes the adjusting voltage, which is transmitted through the data signal input terminal Data, to the source of the driving transistor, so as to adjust the bias state of the driving transistor Mn; and the anode reset transistor M6 is turned on under control of the first control signal terminal S1 and then provides the reset signal to the anode of the light emitting element 31. The operating process of the pixel circuit in the light emitting phase T3 of the period Z2 of the holding frame is the same as the operating process in the light emitting phase T3 of the period Z1 of the data writing frame.

The display panel includes data lines electrically connected to the plurality of pixel circuits. The data line is the data signal input terminal. As can be seen from the timing sequence diagram shown in FIG. 3, the data signal input terminal Data provides the data signal in the period Z1 of the data writing frame, and the data signal input terminal Data has begun to provide the adjusting voltage VJ before the end of the light emitting phase T3 of the period Z1 of the data writing frame. That is, after each data writing phase of the period of the data writing frame ends, the data line begins to provide the adjusting voltage VJ. In addition, after the data signal are provided by the data line, some signals of the data line (i.e., the data signal input terminal Data) can be the data signals. In the period Z2 of the holding frame, the reset module 215 is kept turned off, the pixel circuit does not execute the reset phase T1, and thus a potential in the previous light emitting phase is maintained on the gate of the driving transistor Mn, and the driving transistor Mn generates the driving current under control of the potential in the previous light emitting phase. Therefore, it can be ensured that the light-emission brightness of the light emitting element driven by the pixel circuit in the period Z2 of the holding frame is the same as the light-emission brightness of the light emitting element in the period Z1 of the data writing frame.

When the light-emission controlling module 214 is turned off, the light-emission controlling module 214 cannot supply the driving current to the light emitting element 31, and thus the light emitting element 31 does not emit light. When an effective level signal is provided by the light-emission controlling signal terminal E, the light-emission controlling module 214 is turned on and can supply the driving current generated by the driving transistor Mn to the light emitting element 31, and thus the light emitting element 31 emits light. In the beginning of the light emitting phase of the light emitting element 31 includes a brightness rising process, and the brightness rising rate is related to the bias state of the driving transistor Mn.

The period Z1 of the data writing frame includes a phase for resetting the gate of the driving transistor Mn. After a voltage VR of the voltage signal of the reset signal terminal Ref is supplied to the gate of the driving transistor Mn, it begins to affect the bias state of the driving transistor Mn. In the beginning of the data writing phase T2, the voltage of the gate of the driving transistor Mn is VR, and the voltage of the source of the driving transistor Mn is maintained at its voltage in the previous light emitting phase, which is close to the voltage VP provided by the first power supply terminal PV. Therefore, the gate-source voltage of the driving transistor Mn is Vgs1=VR−VP.

Figure 4:
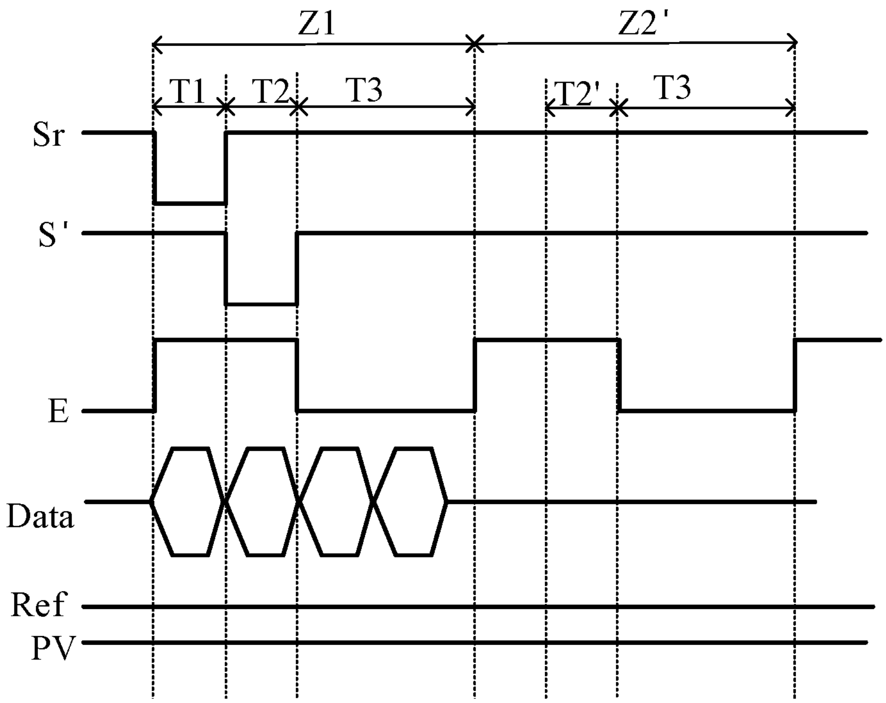
FIG. 4 is a timing sequence diagram of a pixel circuit in a display panel according to the related art.

FIG. 4 is a timing sequence diagram of a pixel circuit in a display panel according to the related art. In the related art, the control terminal of the data writing module 211 and the control terminal of the compensation module 213 are connected to a same scanning signal terminal S'. In the related art, the display panel executes the period Z2' of the holding frame after the period Z1 of the data writing frame, and the duration of the period Z1 of the data writing frame is equal to the duration of the period Z2' of the holding frame. However, the data writing module 211 and the compensation module 213 are turned off in the period Z2' of the holding frame, and the period Z2' of the holding frame does not include the process for resetting the gate of the driving transistor Mn. The gate of the driving transistor Mn is maintained at its potential in the previous light emitting phase to generate the driving current. The potential of the gate of the driving transistor Mn in the previous light emitting phase is the potential after the data signal $V_{Data}$ is written to the gate, that is, $V_{Data}$+Vth, where Vth is the threshold voltage of the driving transistor Mn. At a moment T2' in the period Z2 of the holding frame', which corresponds to the data writing phase T2 in the period Z1 of the data writing frame. The source of the driving transistor Mn is maintained at its potential in the previous light emitting phase and is close to VP. At this time, the gate-source voltage of the driving transistor Mn is Vgs1'=$V_{Data}$+Vth−VP. Taking $V_{Ref}$=−3V and Vth=−2V as an example, according to the formula of the driving current Id=K*(VP−$V_{Data}$)$^2$, the larger the $V_{Data}$, the smaller the driving current Id. Therefore, when a low gray scale display is performed, $V_{Data}$ is relatively larger. In addition, the larger the $V_{Data}$, the larger the difference between Vgs1' and Vgs1, that is, the bias states of the driving transistor Mn in the two cases are significantly different, which results in a significant difference between brightness rising rates of the light emitting element 31 in the period Z1 of the data writing frame and the period Z2' of the holding frame, where |Vgs1|>|Vgs1'|. In the period Z1 of the data writing frame, after the light-emission controlling module 214 is turned on, the brightness rising rate of the light emitting element 31 is slow. However, in the period Z2' of the holding frame, after the light-emission controlling module 214 is turned on, the brightness rising rate of the light emitting element 31 is fast.

Figure 5:
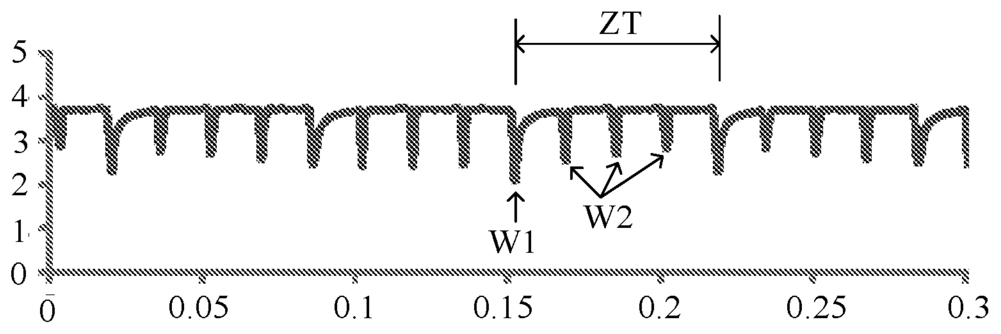
FIG. 5 depicts a brightness curve of the display panel in the related art when the display panel is operating.

FIG. 5 illustrates a brightness curve of the display panel in the related art when the display panel is operating, the horizontal coordinate axis indicates time, and the vertical coordinate axis indicates brightness. FIG. 5 shows one operation mode of the display panel, in which one period Z1 of the data writing frame and three periods Z2' of the holding frame are executed in one cycle ZT. The position W1 represents the brightness rising process of the light emitting element in the period Z1 of the data writing frame. The position W2 represents the brightness rising process of the light emitting element in the period Z2' of the holding frame. It can also be seen from the figure that the brightness rising rate of the light emitting element in the period Z1 of the data writing frame is slower than the brightness rising rate of the light emitting element in the period Z2' of the holding frame. As a result, the flicker problem of the display images in the related art is more pronounced.

Continuing to refer to the timing sequence diagram shown in FIG. 3, the operation of the display panel provided by the present disclosure includes the period Z2 of the holding frame, and the period Z2 of the holding frame includes a reset and adjustment phase T4. In the reset and adjustment phase T4, the data writing module 211 writes the adjusting voltage VJ to the source of the driving transistor Mn. In this phase, the voltage of the source of the driving transistor Mn is close to VJ, the potential of the gate of the driving transistor Mn is maintained at its potential in the previous light emitting phase, and thus the voltage of the gate of the driving transistor Mn is close to $V_{Data}$+Vth. At this time, the gate-source voltage of the driving transistor Mn is Vgs2=$V_{Data}$+Vth−VJ. In the present disclosure, the bias state of the driving transistor Mn is adjusted by adjusting the adjusting voltage VJ, the difference between Vgs2 and Vgs1 can be reduced, such that Vgs2 is close to Vgs1. In other words, the adjusting voltage VJ is written to the source of the driving transistor Mn in the reset and adjustment phase T4 to match the bias state of the driving transistor Mn in the period Z1 of the data writing frame, and thus the brightness rising rate of the light emitting element 31 in the period Z2 of the holding frame is reduced, such that the brightness rising rate of the light emitting element in the period Z2 of the holding frame is consistent with the brightness rising rate of the light emitting element in the period Z1 of the data writing frame, thereby improving the flicker problem of the display images.

In an embodiment, as shown in FIG. 2, the data writing module 211 includes a first transistor M1*a*. A first terminal of the first transistor M1*a* is connected to the data signal input terminal Data, a second terminal of the first transistor M1*a* is connected to the source of the driving transistor Mn, and a gate of the first transistor M1*a* is connected to the first control signal terminal S1. During the data writing phase T2, under control of the signal of the first control signal terminal S1, the first transistor M1*a* writes the voltage signal to the source of the driving transistor Mn. During the reset and adjustment phase T4, under control of the signal of the first control signal S1, the first transistor M1*a* writes the adjusting voltage to the source of the driving transistor Mn. In the present embodiment, the first transistor M1*a* is used as the data writing transistor during the data writing phase T2, and is also used as the voltage adjusting transistor during the reset and adjustment phase T4, such that adding the reset and adjustment phase in the period of the holding frame can be achieved by just changing the driving timing sequence of the pixel circuit without changing the structure of the pixel circuit.

Continuing to refer to FIG. 2, the compensation module 213 includes a compensation transistor M2. A first terminal of the compensation transistor M2 is connected to the drain of the driving transistor Mn, a second terminal of the compensation transistor M2 is connected to the gate of the driving transistor Mn, and a gate of the compensation transistor M2 is connected to the second control signal terminal S2. That is, the gate of the compensation transistor M2 and the gate of the first transistor M1*a* are respectively connected to different control signal terminals, such that the on-off state of the compensation module 213 and the on-off state of the data writing module 111 can be controlled independently, thereby ensuring that the data writing module 211 is turned on and the compensation module 213 is turned off in the reset and adjustment phase T4.

Continuing to refer to FIG. 2, the light-emission controlling module 214 includes a first light-emission controlling module 214*a* and a second light-emission controlling module 214*b*. The first light-emission controlling module 214*a* is connected between a first power supply terminal PV and the source of the driving transistor Mn, and the second light-emission controlling module 214*b* is connected between the drain of the driving transistor Mn and the light emitting element 31. As shown in FIG. 2, the control terminal of the first light-emission controlling module 214*a* and the control terminal of the second light-emission controlling module 214*b* are both connected to the light-emission controlling signal terminal E. In another embodiment, the first light-emission controlling module 214*a* and the second light-emission controlling module 214*b* are controlled by different control signals, and thus the on-off state of the first light-emission controlling module 214*a* and the on-off state of the second light-emission controlling module 214*b* can be different. In the embodiment of the present disclosure, in the reset and adjustment phase T4, at least the first light-emission controlling module 214*a* is kept being turned off, thereby ensuring that the bias state of the driving transistor is adjusted in this phase through writing the adjusting voltage to the source of the driving transistor and avoiding that the first light-emission controlling module 214*a* supplies the voltage signal to the source of the driving transistor and affects the adjusting of the bias state of the driving transistor.

In an embodiment, the first light-emission controlling module 214*a* includes a first light-emission controlling transistor M3, and the second light-emission controlling module 214*b* includes a second light-emission controlling transistor M4. A gate of the first light-emission controlling transistor M3 and a gate of the second light-emission controlling transistor M4 are both connected to the light-emission controlling terminal E. A first terminal of the first light-emission controlling transistor M3 is connected to the first power supply terminal PV, and a second terminal of the first light-emission controlling transistor M3 is connected to the source of the driving transistor Mn. A first terminal of the second light-emission controlling transistor M4 is connected to the drain of the driving transistor Mn, and a second terminal of the second light-emission controlling transistor M4 is connected to the light emitting element 31.

In an embodiment, as shown in FIG. 2, the reset module 215 includes a reset transistor M5. A control terminal of the reset transistor M5 is connected to the reset controlling signal terminal Sr, a first terminal of the reset transistor M5 is connected to the reset signal terminal Ref, and a second terminal of the reset transistor M5 is connected to the gate of the driving transistor Mn.

In an embodiment, during the reset phase T1, the voltage of the gate of the driving transistor Mn is Vg1, a voltage of the source of the driving transistor Mn is Vs1, and a gate-source voltage of the of the driving transistor Mn is Vgs, which is equal to Vg1−Vs1. In an embodiment, Vg1 is close to the reset signal VR that is written to the gate of the driving transistor Mn by the reset module 215, the voltage of the source of the driving transistor Mn is maintained at its voltage in the previous phase during the light emitting, and Vs1 is close to the voltage VP provided by the first power supply terminal PV.

In the reset and adjustment phase T4, the gate-source voltage of the driving transistor Mn is Vg2, the voltage of the source of the driving transistor Mn is Vs2, and a gate-source voltage of the driving transistor Mn is Vgs1, which is equal to Vg2−Vs2. Specifically, the gate of the driving transistor Mn is maintained at its potential in the light emitting phase, and thus Vg2 is close to $V_{Data}$+Vth, and Vs2 is close to the adjusting voltage VJ that is written to the source of the driving transistor.

For the driving transistor Mn, when its gate-source voltage is smaller than Vth, the driving transistor is turned on, and the greater the gate-source voltage, the greater the bias degree of the driving transistor. In the present embodiment, $-3V \le Vg1-Vs1-(Vg2-Vs2) \le 3V$, that is, $-3V \le Vgs-Vgs1 \le 3V$. In this way, the difference between the bias state of the driving transistor Mn in the period Z2 of the holding frame and the bias state of the driving transistor Mn in the period Z1 of the data writing frame is small, which can decrease the brightness rising rate of the light emitting element 31 in the period Z2 of the holding frame. Therefore, the brightness rising rate of the light emitting element in the period Z2 of the holding frame is consistent with the brightness rising rate of the light emitting element in the period Z1 of the data writing frame, thereby reducing the flicker problem of the display images.

In some embodiments, $-2V \le Vg1-Vs1-(Vg2-Vs2) \le 2V$. In some other embodiments, $-1V \le Vg1-Vs1-(Vg2-Vs2) \le 1V$. With such configuration, the difference between the bias state of the driving transistor Mn in the period Z1 of the holding frame and the bias state of the driving transistor Mn in the period Z2 of the data writing frame can be further reduced, and the flicker problem of the display images can be further improved, thereby improving the display effects.

In the embodiments of the present disclosure, the adjusting voltage is written to the source of the driving transistor Mn in the reset and adjustment phase T4 so as to adjust the bias state of the driving transistor Mn, and the following factors can be taken into account for the value of the adjusting voltage VJ.

In an embodiment, at the beginning of the reset and adjustment phase T4, the voltage of the source of the driving transistor Mn is Vs1, and VJ>Vs1. The adjusting voltage VJ is written to the source of the driving transistor Mn during the reset and adjustment phase T4, the voltage of the source of the driving transistor Mn is increased during the reset and adjustment phase T4, and thus the bias state of the driving transistor Mn is increased, and the difference between the bias state of the driving transistor Mn in the period Z1 of the holding frame and the bias state of the driving transistor Mn in the period Z2 of the data writing frame. In an embodiment, $0V < VJ-Vs1 \le 3.5V$. In an embodiment, $1V < VJ-Vs1 \le 3.5V$. It is set that VJ>Vs1 so as to adjust the bias state of the driving transistor in the period of the holding frame, and it is not necessary to set VJ at a too large value while reducing the flicker problem of the display images, to reduce power consumption.

In an embodiment, the period Z2 of the holding frame does not include the reset phase T1 or the data writing phase T2. At the beginning of the reset and adjustment phase T4, the source of the driving transistor Mn is maintained at its voltage in the previous light emitting phase. Vs1 is close to the power supply voltage VP that is written to the source of the driving transistor Mn through turning on the first power supply terminal PV by the light-emission controlling module 214 in the previous light emitting phase. In the embodiments of the present disclosure, VJ≥VP, so as to adjust the bias state of the driving transistor in the holding frame, which is equivalent to writing the adjusting voltage VJ to the source of the driving transistor Mn in the reset and adjustment phase T4 to simulate the bias state of the driving transistor Mn in the period Z1 of the data writing frame, and thus the brightness rising rate of the light emitting element 31 in the period Z2 of the holding frame is reduced, such that the brightness rising rate of the light emitting element in the period Z2 of the holding frame is consistent with the brightness rising rate of the light emitting element in the period Z1 of the data writing frame, thereby reducing the flicker problem of the display images.

In an embodiment, VP=4.6V, and 6V≤VJ≤8V. VJ is set to be greater than VP, and VJ is not too large to avoid excessive power consumption.

In an embodiment, a maximum value of the voltage of a preset data signal is VD, VJ≥VD. The voltage of the preset data signal is the preset data voltage needed for different display gray scales of the display panel. The lower the display gray scale, the greater the voltage of the corresponding preset data signal. VJ≥VD, that is, VJ is not smaller than a preset dark-state voltage of the display panel. According to the description in the above embodiments, after resetting the gate of the driving transistor Mn in the period Z1 of the data writing frame, the gate-source voltage of the driving transistor Mn is Vgs1, which is equal to VR−VP. During the reset and adjustment phase T4, the gate-source voltage of the driving transistor Mn is Vgs2, which is equal to $V_{Data}$+Vth−VJ. VJ≥VD≥$V_{Data}$, so $V_{Data}$−VJ≤0, and Vgs2≤Vth, and only when $V_{Data}$=VD, Vgs2=Vth. That is, when the holding frame displays a non-dark-state, it can be ensured that the driving transistor is in the bias state after the adjusting voltage is written to the driving transistor during the reset and adjustment phase, and thus the bias of the driving transistor is adjusted. In the embodiments of the present disclosure, the power supply voltage VP provided by the first power supply terminal PV is smaller than VD. In an embodiment, VP=4.6V, and VD=5.5V. Based on the description of the principle in the above embodiment of FIG. 2, it can be deduced that when VJ is greater than VP, the bias state of the driving transistor can be adjusted. In the present embodiment, VJ is arranged to be greater than VP, and VD is greater than VP, which can ensure to a large extent that the bias state of the driving transistor in the period of the holding frame is large enough, and can make the bias state of the driving transistor in the period of the holding frame close to the bias state of the driving transistor in the period of the data writing frame, thereby reducing the flicker problem of display images.

In an embodiment, the voltage of the reset signal is VR, and VJ≥VR. The voltage VR of the reset signal in the display panel is relatively small. By setting VJ not smaller than VR, it can be avoided that the voltage written to the source of the driving transistor is too small for the bias adjustment when adjusting the bias state of the driving transistor in the period of the holding frame.

In an embodiment, the adjusting voltage VJ is a constant voltage.

Figure 10:
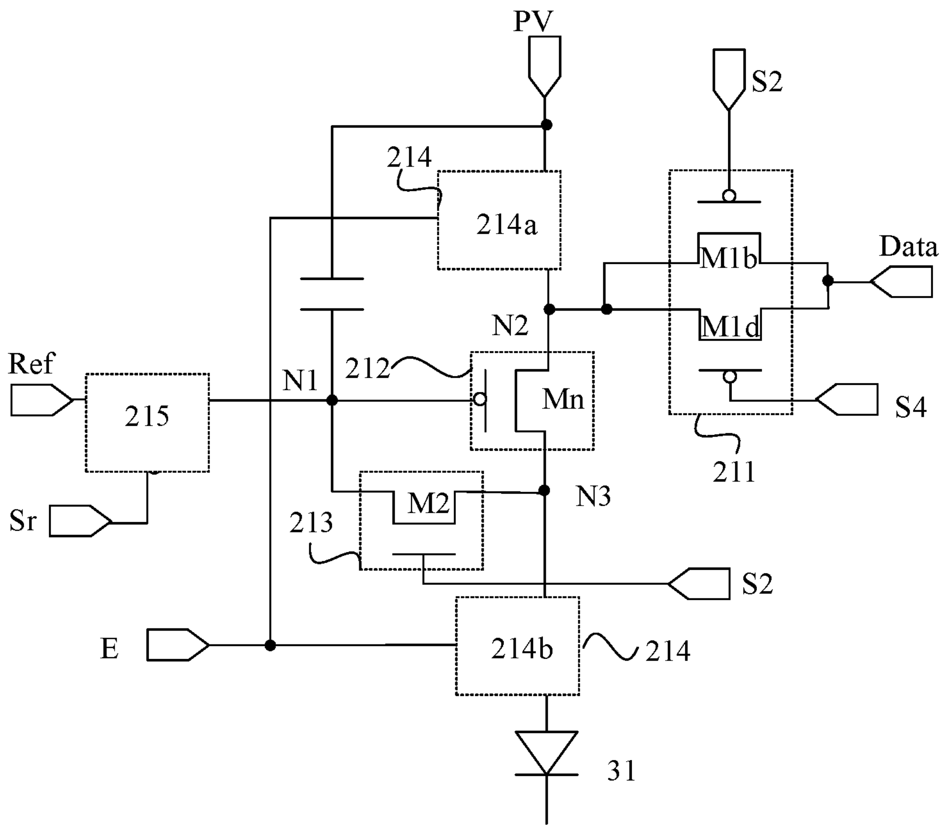
FIG. 10 is another schematic diagram of a pixel circuit in the display panel according to an embodiment of the present disclosure.

Corresponding to the pixel circuit structure in the embodiments shown in FIG. 2 and FIG. 10, the data signal input terminal Data provides the data signal during the data writing phase, and provides the adjusting voltage VJ during the reset and adjustment phase. That is, the data signal input terminal is reused during the two phases. Generally, the data signal input terminal in the display module is connected to a driving circuit (i.e., a driving chip) through the data line in the display panel. By setting the adjusting voltage VJ to a constant voltage, when the display panel is working in the period of the holding frame, the driving circuit provides a constant voltage to the data signal input terminal, which can simplify the operation mode of the driving circuit.

Figure 7:
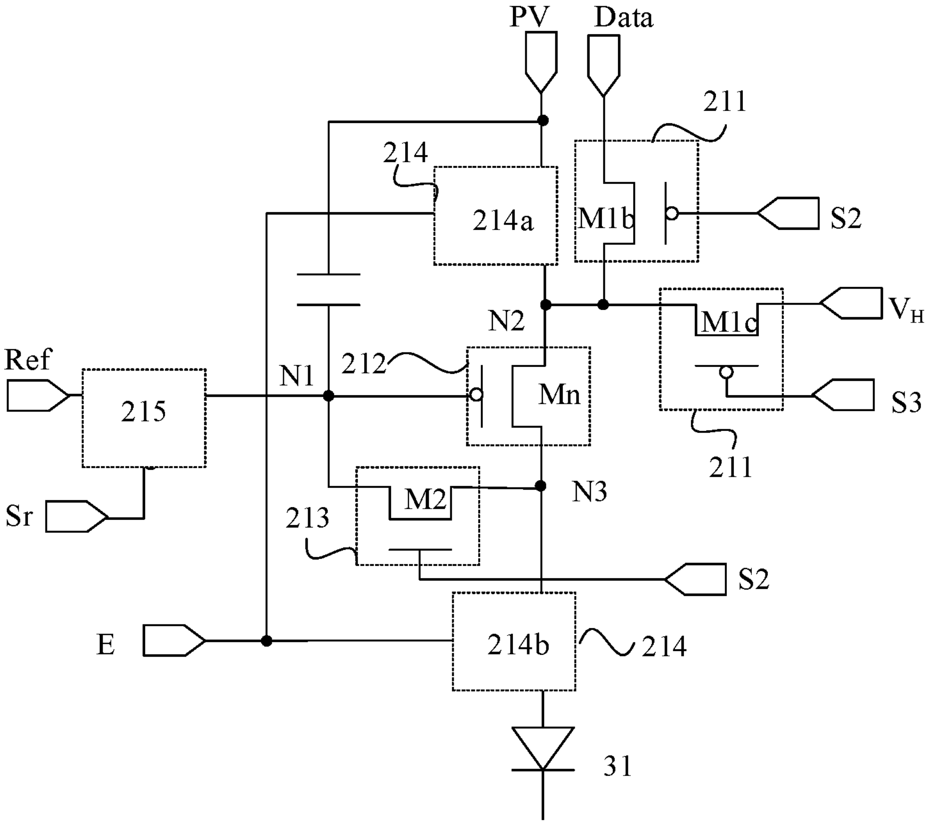
FIG. 7 is another schematic diagram of a pixel circuit in the display panel according to an embodiment of the present disclosure.

Corresponding to the pixel circuit structure of the embodiments shown in FIG. 7, a data signal input terminal Data and a voltage adjusting signal input terminal $V_H$ are two different signal terminals. The process of writing the adjusting voltage to the source of the driving transistor during the reset and adjustment phase does not affect the controlling of the process of data writing. In this embodiment, the adjusting voltage VJ is a constant voltage, and the voltage adjusting signal input terminals $V_H$ corresponding to third transistors M1*c* of at least two pixel circuits in the display panel are connected to a same voltage adjusting signal line, and thus the number of the adjusting signal lines in the display panel is reduced. With such configuration, one output port of the driving circuit can supply the adjusting signal to multiple voltage adjusting signal lines, which can reduce the number of ports in the driving circuit and can also reduce the power consumption of the transmission of the adjusting signal on the voltage adjusting signal line.

In an embodiment, in the reset and adjustment phase T4, the voltage of the gate of the driving transistor Mn is Vg2, the voltage of the source of the driving transistor Mn is Vs2, and the gate-source voltage of the driving transistor Mn is set to Vgs2=Vg2−Vs2≤−2V. The value of Vgs2 is set within a certain range so as to ensure the driving transistor Mn is in the bias state, and the bias state in this phase is close to the bias state of the driving transistor Mn during the period Z1 of the data writing frame. Therefore, the brightness rising rate of the light emitting element in the period Z2 of the holding frame is consistent with the brightness rising rate of the light emitting element in the period Z1 of the data writing frame, thereby reducing the flicker problem of the display images.

Figure 6:
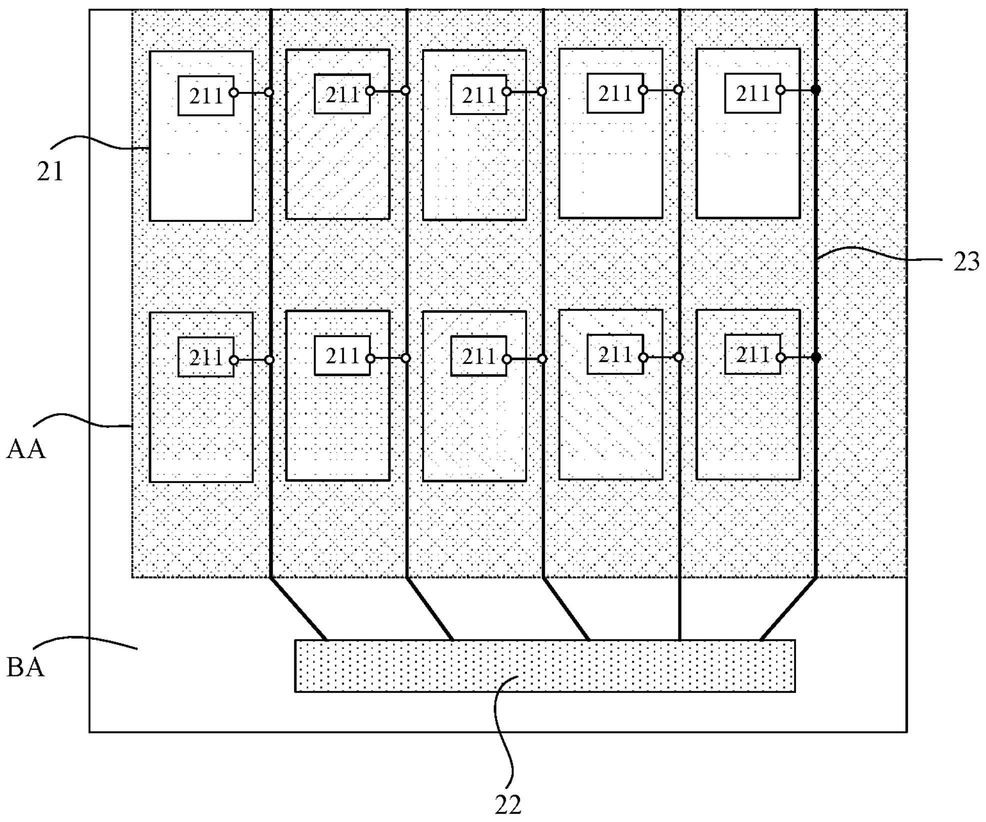
FIG. 6 is a schematic diagram of a circuit of another display panel according to an embodiment of the present disclosure.

In an embodiment, FIG. 6 is another schematic diagram showing a display panel according to an embodiment of the present disclosure, FIG. 6 schematically shows the partial structure of the display panel. The display panel has a display area AA and a non-display area BA. The pixel circuit 21 in the display panel includes the circuit structure shown in FIG. 2. For simplicity, the drawing only shows the data writing module 211 of the pixel circuit 21. The display panel further includes a driving circuit 22 and data lines 23. In an embodiment, the driving circuit 22 is the driving chip, and the driving circuit 22 is connected to the data writing module 211 through the data lines 23.

When the display panel is operating, the driving circuit 22 supplies a data signal to the data writing module 211 through the data line 23 during the data writing phase T2, and the driving circuit 22 supplies an adjusting voltage VJ to the data writing module 211 though the data line 23 during the reset and adjustment phase T4. In an embodiment, the display panel executes at least one period Z2 of the holding frame after the period Z1 of the data writing frame. One data line 23 is electrically connected to multiple pixel circuits in one pixel column. In an embodiment, in the period Z1 of the data writing frame, after the multiple pixel circuits connected to one data line 23 all finish the data writing phase T2, the driving circuit 22 controls to supply the adjusting voltage VJ to the data line 23 so as to achieve that in the period Z2 of the holding frame, the pixel circuits adjacent to this data line 23 executes the reset and adjustment phase T4. In an embodiment, the adjusting voltage VJ is not smaller than the maximum value of the preset data voltage the driving circuit 22 can output. In the present embodiment, the driving circuit supplies different voltage signals to the data line in different operation phases, such that the data writing module is reused in the data writing phase and the reset and adjustment phase, and the bias state of the driving transistor in the period of the holding frame is adjusted to reduce the flicker problem of the display panel while there is no need to change the structure of the pixel circuit and the connection between the pixel circuit and the driving circuit.

Figure 8:
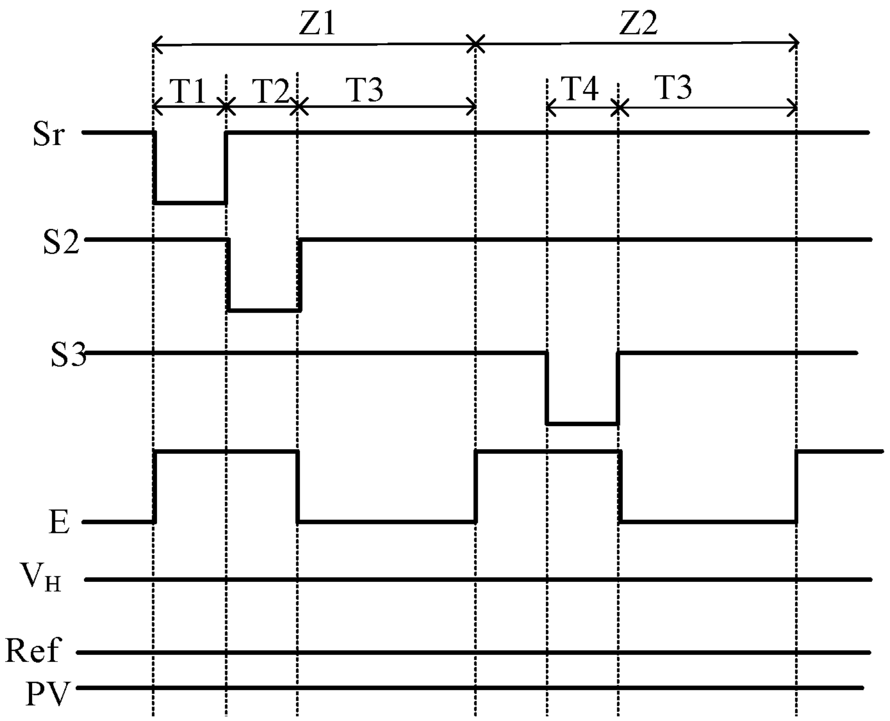
FIG. 8 is a timing sequence diagram of the display panel provided in the embodiment shown in FIG. 7.

In another embodiment, FIG. 7 is another schematic diagram of a pixel circuit in the display panel according to an embodiment of the present disclosure, and FIG. 8 is a timing sequence diagram of the display panel provided in the embodiment shown in FIG. 7.

As shown in FIG. 7, the data writing module 211 includes a second transistor M1*b* and a third transistor M1*c*. A first terminal of the second transistor M1*b* is connected to the data signal input terminal Data, a second terminal of the second transistor M1*b* is connected to the source of the driving transistor Mn, and a gate of the second transistor M1*b* is connected to the second control signal terminal S2. A first terminal of the third transistor M1*c* is connected to the voltage adjusting signal input terminal $V_H$, a second terminal of the third transistor M1*c* is connected to the source of the driving transistor Mn, and a gate of the third transistor M1*c* is connected to the third control signal terminal S3. The pixel circuit includes a compensation module 213, and the compensation module 213 includes a compensation transistor M2. A first terminal of the compensation transistor M2 is connected to the gate of the driving transistor Mn, a second terminal of the compensation transistor M2 is connected to the drain of the driving transistor Mn, and a gate of the compensation transistor M2 is connected to the second control signal terminal S2. As shown in the drawings, the pixel circuit further includes a driving module 212, a light-emission controlling module 214 and a reset module 215. For the connection relationship of these modules and control terminals, reference can be made to the corresponding description of the embodiment in FIG. 2 described above, which will not be repeated herein.

The operating process of the display panel includes a period Z1 of the data writing frame and a period Z2 of the holding frame.

In the period Z1 of the data writing frame, the pixel circuit executes a reset phase T1, a data writing phase T2, and a light emitting phase T3. During the reset phase T1, the reset module 215 is turned on under the control of a signal of a reset control signal terminal Sr, and supplies the signal of the reset signal terminal Ref to the gate of the driving transistor Mn to reset the gate of the driving transistor Mn. During the data writing phase T2, under control of the signal of the second control signal terminal S2, the second transistor M1*b* writes the data signal to the source of the driving transistor Mn, and at the same time, under control of the signal of the second control signal terminal S2, the compensation transistor M2 is turned on and supplies the voltage of the drain of the driving transistor Mn to the gate of the driving transistor Mn. In this phase, the data signal is written to the gate of the driving transistor Mn, and the threshold voltage of the driving transistor Mn is compensated. During the light emitting phase T3, the light-emission controlling module 214 is turned on under the control of the light-emission control signal terminal E, and thus supplies the driving current generated by the driving transistor Mn to the light emitting element 31.

In the period Z2 of the holding frame, the pixel circuit executes a reset and adjustment phase T4 and the light emitting phase T3. During the reset and adjustment phase T4, under control of the signal of the third control signal terminal S3, the third transistor M1*c* writes the adjusting voltage VJ to the source of the driving transistor Mn. During the light emitting phase T3, the light-emission controlling module 214 is turned on under the control of the signal of the light-emission control signal terminal E, and the gate of the driving transistor Mn is maintained at the potential in the previous light emitting phase, and the driving transistor Mn is turned on udder the control of the voltage of the gate and generates the driving current. In this phase, the driving current generated by the driving transistor Mn is supplied to the light emitting element 31. In the period Z2 of the holding frame, the compensation module 213 and the reset module 215 are turned off.

In this embodiment, the reset and adjustment phase T4 is within the period Z2 of the holding frame. During the reset and adjustment phase T4, the adjusting voltage VJ is written to the source of the driving transistor Mn to simulate the bias state of the driving transistor Mn in the period Z1 of the data writing frame, and thus the brightness rising rate of the light emitting element 31 in the period Z2 of the holding frame is reduced, such that the brightness rising rate of the light emitting element in the period Z2 of the holding frame is consistent with the brightness rising rate of the light emitting element in the period Z1 of the data writing frame, thereby reducing the flicker problem of the display images. The data writing module 211 includes a second transistor M1*b* and a third transistor M1*c*. The second transistor M1*b* is a data writing transistor, and the third transistor M1*c* is a voltage adjusting transistor. The input terminal (the first terminal) of the second transistor and the input terminal (the first terminal) of the third transistor are connected to different signal input terminals, and the two transistors are controlled by different control signal terminals, which can control the data writing phase and the reset and adjustment phase independently. The gate of the data writing transistor and the gate of the compensation transistor are connected to a same control signal terminal (the second control signal terminal), which can ensure that the compensation transistor and the data writing transistor can be turned on simultaneously during the data writing phase, without additional control of the compensation transistor.

Figure 9:
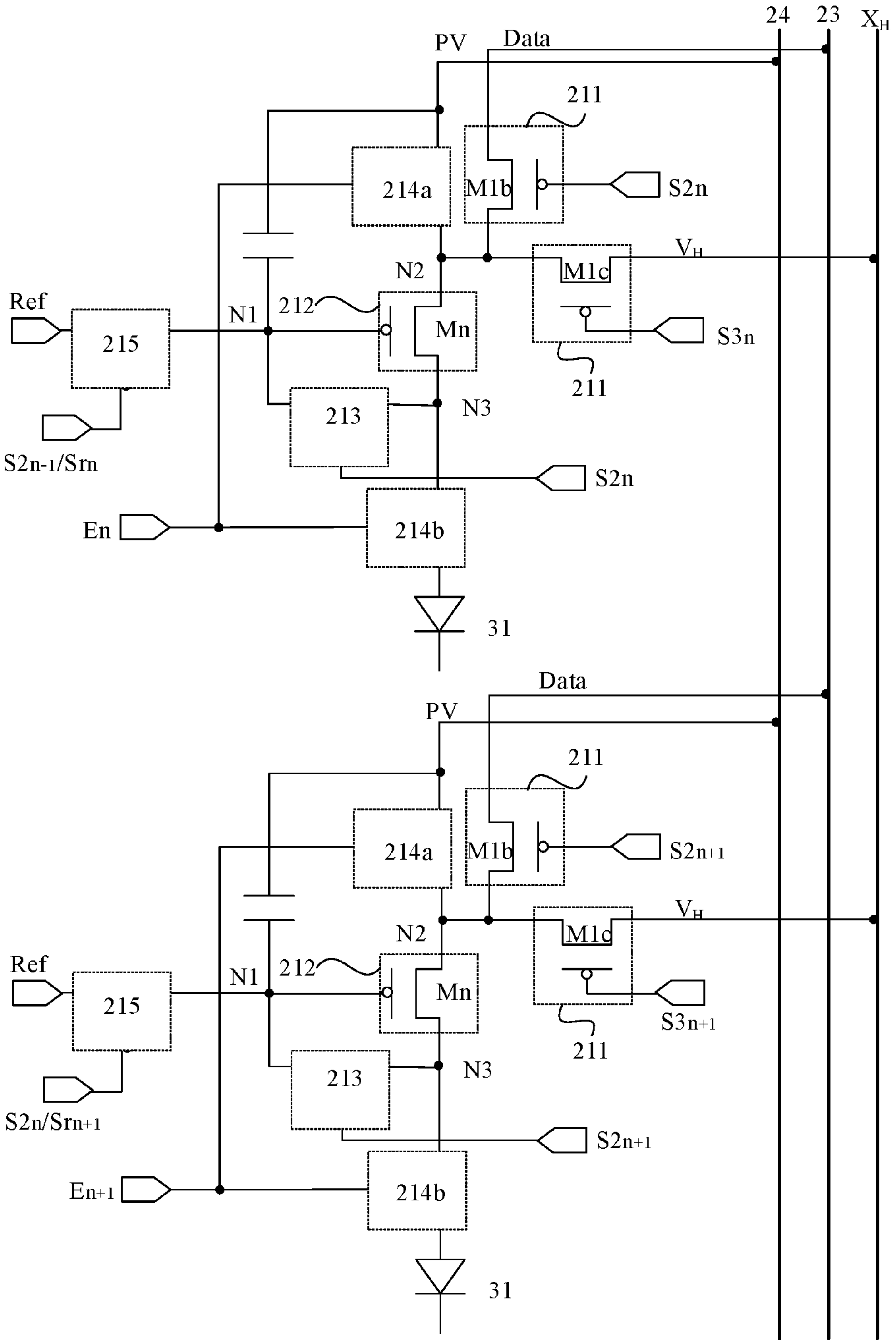
FIG. 9 is a schematic diagram of a circuit of a display panel according to an embodiment of the present disclosure.

In an embodiment, adjusting signal input terminals of at least two third transistors are connected to a same adjust signal line. FIG. 9 is a schematic diagram of a display panel according to an embodiment of the present disclosure. FIG. 9 shows two pixel circuits that are located in the same pixel column. The voltage adjusting signal input terminals $V_H$ corresponding to the third transistors M1*c* of two pixel circuits are connected to the same voltage adjusting signal line $X_H$. FIG. 9 also shows the data line 23 and the power supply signal line 24. The data signal terminals Data of the two pixel circuits are connected to the same data line 23, and the power supply signal terminals PV of the two pixel circuits are connected to the same power supply signal line 24. One of the two pixel circuits is located in the n-th pixel row, and the other one of the two pixel circuits is located in the (n+1)-th pixel row. The second control signal terminal of the pixel circuit in the n-th pixel row is denoted as $S2_n$, and the second control signal terminal of the pixel circuit in the (n+1)-th pixel row is denoted as $S2_{n+1}$. Other reference numerals in FIG. 9 can be referred to this for understanding, and are not explain them one by one here.

In another embodiment, the voltage adjusting signal input terminals corresponding to the third transistors of multiple pixel circuits in the same pixel row are connected to a same voltage adjusting signal line, which is not illustrated in the drawing.

Since the voltage adjusting signal input terminals corresponding to the third transistors of multiple pixel circuits are connected to the same voltage adjusting signal line, the number of the voltage adjusting signal lines in the display panel is reduced, the space for wiring in the display panel can be saved. In an embodiment, the input terminals of all voltage adjusting signal line in the display panel is connected to a same output port of the driving circuit (driving chip), and thus, the number of ports is reduced, and at the same time, the voltage dropping of the voltage adjusting signal line during the transmission of the voltage adjusting signal is also reduced to reduce the power consumption.

Figure 11:
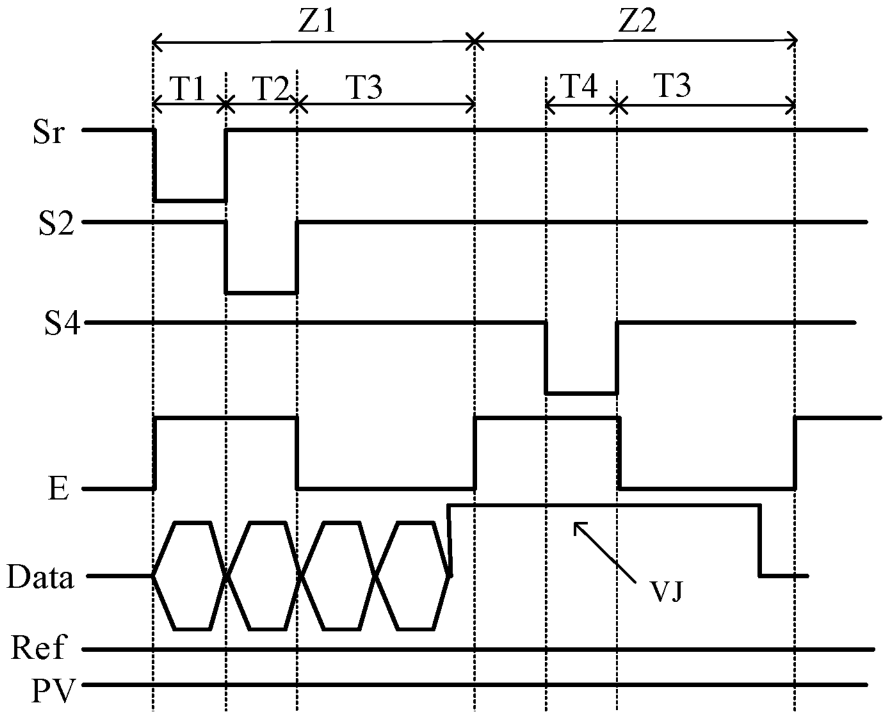
FIG. 11 is a timing sequence diagram of the display panel provided in the embodiment shown in FIG. 10.

In another embodiment, FIG. 10 is another schematic diagram of a pixel circuit in the display panel according to an embodiment of the present disclosure, and FIG. 11 is a timing sequence diagram of the display panel provided in the embodiment shown in FIG. 10.

As shown in FIG. 10, the data writing module 211 includes a second transistor M1*b* and a fourth transistor M1*d*. A first terminal of the second transistor M1*b* is connected to the data signal input terminal Data, a second terminal of the second transistor M1*b* is connected to the source of the driving transistor Mn, and a gate of the second transistor M1*b* is connected to the second control signal terminal S2. A first terminal of the fourth transistor M1*d* is connected to the data signal input terminal Data, a second terminal of the fourth transistor M1*d* is connected to the source of the driving transistor Mn, and a gate of the fourth transistor M1*d* is connected to a fourth control signal terminal S4. The pixel circuit includes a compensation module 213, and the compensation module 213 includes a compensation transistor M2. A first terminal of the compensation transistor M2 is connected to the gate of the driving transistor Mn, a second terminal of the compensation transistor M2 is connected to the drain of the driving transistor Mn, and a gate of the compensation transistor M2 is connected to the second control signal terminal S2. As shown in the drawings, the pixel circuit further includes a driving module 212, a light-emission controlling module 214 and a reset module 215. The connection relationship of these modules and control terminals can be referred to the corresponding description of the embodiment in FIG. 2 described above, which will not be repeated herein.

The operating process of the display panel includes a period Z1 of the data writing frame and a period Z2 of the holding frame. Specifically:

In the period Z1 of the data writing frame, the pixel circuit executes a reset phase T1, a data writing phase T2, and a light emitting phase T3. During the reset phase T1, the reset module 215 is turned on under the control of the signal of the reset control signal terminal Sr, and supplies the signal of the reset signal terminal Ref to the gate of the driving transistor Mn to reset the gate of the driving transistor Mn. During the data writing phase T2, under control of the signal of the second control signal terminal S2, the second transistor M1*b* writes the data signal to the source of the driving transistor Mn, and at the same time, under control of the signal of the second control signal terminal S2, the compensation transistor M2 is turned on and supplies the voltage of the drain of the driving transistor Mn to the gate of the driving transistor Mn. In this phase, the data signal is written to the gate of the driving transistor Mn, and the threshold voltage of the driving transistor Mn is compensated. During the light emitting phase T3, the light-emission controlling module 214 is turned on under the control of the light-emission control signal terminal E, and supplies the driving current generated by the driving transistor Mn to the light emitting element 31.

In the period Z2 of the holding frame, the pixel circuit executes a reset and adjustment phase T4 and the light emitting phase T3. During the reset and adjustment phase T4, under control of the signal of the fourth control signal terminal S4, the fourth transistor M1*d* writes the adjusting voltage VJ to the source of the driving transistor Mn. During the light emitting phase T3, the light-emission controlling module 214 is turned on under the control of the signal of the light-emission control signal terminal E, and the gate of the driving transistor Mn is maintained at the potential in the previous light emitting phase, and the driving transistor Mn is turned on udder the control of the voltage of the gate and generates the driving current. In this phase, the driving current generated by the driving transistor Mn is supplied to the light emitting element 31. In the period Z2 of the holding frame, the compensation module 213 and the reset module 215 are turned off.

In this embodiment, the reset and adjustment phase T4 is provided in the period Z2 of the holding frame. During the reset and adjustment phase T4, the adjusting voltage VJ is written to the source of the driving transistor Mn to simulate the bias state of the driving transistor Mn in the period Z1 of the data writing frame, and thus the brightness rising rate of the light emitting element 31 in the period Z2 of the holding frame is reduced, such that the brightness rising rate of the light emitting element in the period Z2 of the holding frame is consistent with the brightness rising rate of the light emitting element in the period Z1 of the data writing frame, thereby reducing the flicker problem of the display images. The data writing module 211 includes a second transistor M1*b* and a fourth transistor M1*d*. The second transistor M1*b* is the data writing transistor, and the fourth transistor M1*d* is the voltage adjusting transistor. The input terminal (the first terminal) of the second transistor and the input terminal (the first terminal) of the fourth transistor are connected to the same signal input terminal, and the two transistors are controlled by different control signal terminals, and the gate of the data writing transistor and the gate of the compensation transistor are connected to the same control signal terminal (the second control signal terminal), such that the compensation transistor and the data writing transistor can be turned on simultaneously during the data writing phase, and the data writing module supplies the voltage signal to the source of the driving transistor through different transistors in the period of the data writing frame and the period of the holding frame respectively.

Figure 12:
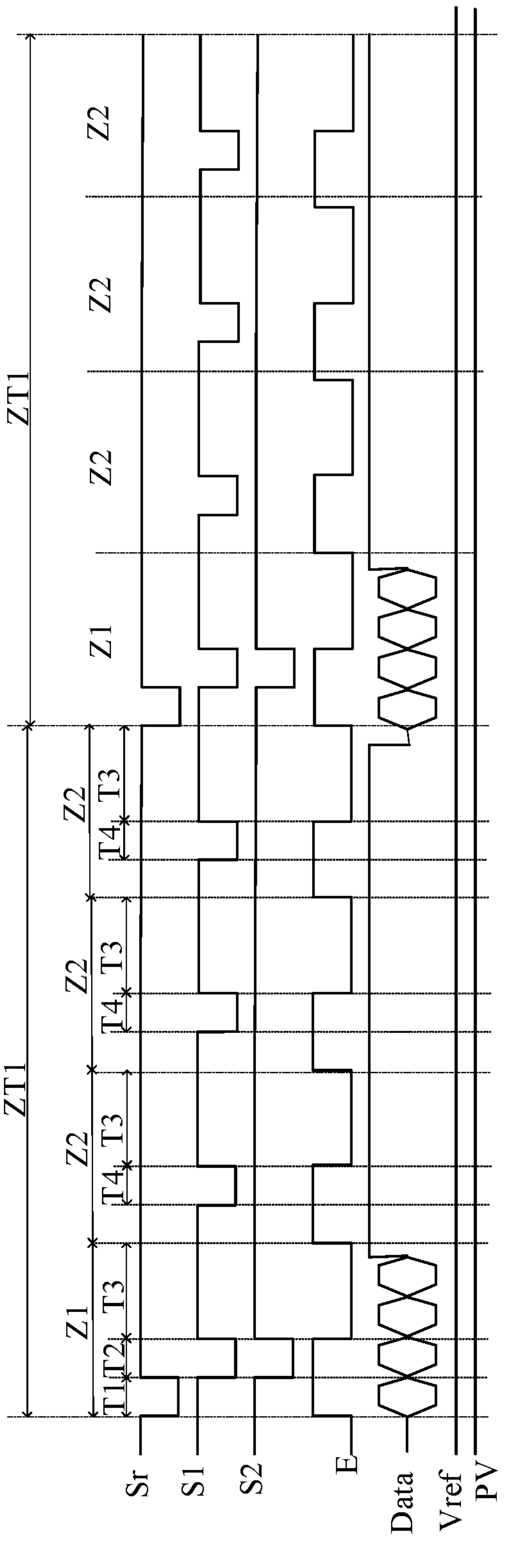
FIG. 12 is another operating timing sequence diagram of the display panel according to an embodiment of the present disclosure.

In an embodiment, the operation mode of the display panel includes a first mode, the first mode includes repeated first cycles, and the first cycle includes one period of the data writing frame and at least one period of the holding frame. FIG. 12 is another operating timing sequence diagram of a display panel according to an embodiment of the present disclosure. As shown in FIG. 12, the first cycle ZT1 includes one period Z1 of the data writing frame and four periods Z2 of the holding frame. The timing sequence of the period Z2 of the holding frame in this drawing is illustrated by the timing sequence diagram in the above-described embodiment of FIG. 3. In the first cycle ZT1, the data signal is written to the pixel circuit in the period Z1 of the data writing frame, and under control of the data signal, the pixel circuit generates the driving current and controls the light emitting element to emit light. The period Z2 of the holding frame does not include the reset phase T1 or the data writing phase T2. In the period Z2 of the holding frame, the gate of the driving transistor is maintained at the potential in the previous light emitting phase, and the driving transistor generates the driving current under control of this potential, that is, the brightness of the light emitting element in the period Z2 of the holding frame is maintained at the brightness of the light emitting element in the period Z1 of the data writing frame. In the embodiments of the present disclosure, the reset and adjustment phase T4 is arranged in the period Z2 of the holding frame for adjusting the bias state of the driving transistor Mn, such that the brightness rising rate of the light emitting element in the period Z2 of the holding frame is consistent with the brightness rising rate of the light emitting element in the period Z1 of the data writing frame, thereby reducing the flicking problem of the display images.

In an embodiment, when the display panel is driven to operate in the first mode, the display panel displays slow-motion video images. In another embodiment, when the display panel is driven to operate in the first mode, the display panel displays a static image.

In an embodiment, the operation mode of the display panel further includes a second mode. The second mode includes repeated periods Z1 of the data writing frame. An image refreshing rate of the display panel in the second mode is greater than an image refreshing rate of the display panel in the first mode. Compared with the first mode, the second mode is a high-frequency operation mode, and the first mode is a low-frequency operation mode. In application, the first mode is used in a scene where the display panel is driven to display dynamic images. The display panel provided by the embodiment of the present disclosure includes different operation modes, and the display panel is switched between the first mode and the second mode according to different requirements for the refreshing rate of the display images of the display panel. For example, the display panel is driven to display static images or a slow-motion video when operating in the first mode, which can reduce the power consumption of the display panel; and the display panel is driven to display dynamic images when operating in the second mode, which can improve the smoothness of the display images.

In an embodiment, the driving transistor Mn is a P-type transistor. In an embodiment, material of an active layer of the driving transistor Mn includes silicon. In an embodiment, the driving transistor Mn is a low-temperature polysilicon transistor. The low-temperature polysilicon transistor has high electron mobility and stability. In an embodiment, the transistor in each module of the pixel circuit is P-type transistor. The pixel circuit including the low-temperature polysilicon transistor can occupy a smaller area while satisfying the driving performance of the light emitting element.

In an embodiment of the present disclosure, the pixel circuit further includes a light emitting element resetting module electrically connected to the light emitting element and configured to reset an electrode of the light emitting element. A first terminal of the light emitting element resetting module is electrically connected to a reset signal terminal, and a second terminal of the light emitting element resetting module is connected to the light emitting element.

In an embodiment, a control terminal of the light emitting element resetting module and the control terminal of the reset module are connected to a same control terminal, and the light emitting element resetting module resets the electrode of the light emitting element during the reset phase.

In another embodiment, the control terminal of the light emitting element resetting module and the control terminal of the compensation module are connected to a same control terminal, and the light emitting element resetting module reset the electrode of the light emitting element during the data writing phase.

Figure 13:
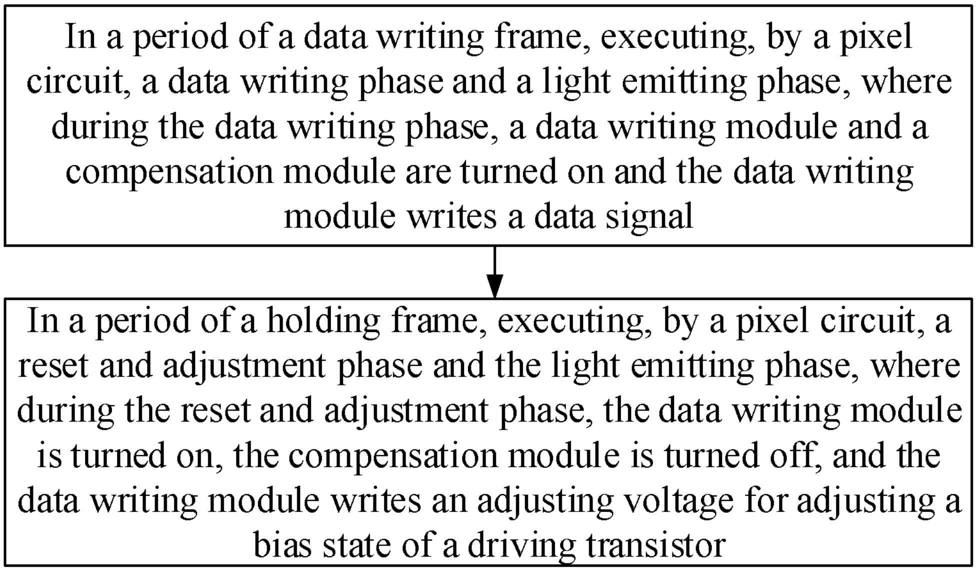
FIG. 13 is a flowchart of a driving method according to an embodiment of the present disclosure.

An embodiment of the present disclosure also provides a method for driving a display panel, which can be applied to drive the display panel provided in the embodiments of the present disclosure. The display panel includes a pixel circuit and a light emitting element. The structure of the pixel circuit, reference can be made to the FIG. 2, FIG. 7 or FIG. 10. The pixel circuit includes a data writing module 211, a driving module 212, and a compensation module 213. The data writing module 211 is configured to provide a data signal and an adjusting voltage. The driving module 212 is configured to provide a driving current to the light emitting element 31. The driving module 212 includes a driving transistor Mn. The compensation module 213 is configured to compensate a threshold voltage of the driving transistor Mn. An operation process of the display panel includes a period Z1 of the data writing frame and a period Z2 of the holding frame. The driving method can be understood in conjunction with the operation process of the display panel in the above display panel embodiments. FIG. 13 is a flowchart of a driving method according to an embodiment of the present disclosure. As shown in FIG. 13, the driving method includes the following steps.

In the period Z1 of the data writing frame, the pixel circuit 21 executes a data writing phase T2 and a light emitting phase T3. During the data writing phase T2, the data writing module 211 and the compensation module 213 are turned on, and the data writing module 211 writes a data signal.

In the period Z2 of the holding frame, the pixel circuit 21 executes a reset and adjustment phase T4 and the light emitting phase T3. During the reset and adjustment phase T4, the data writing module 211 is turned on, the compensation module 213 is turned off, and the data writing module 211 writes the adjusting voltage for adjusting a bias state of the driving transistor Mn.

According to the method provided in the embodiments of the present disclosure, when the display panel is operating in the period of the holding frame, the pixel circuit is controlled to execute the reset and adjustment phase so as to adjust the bias state of the driving transistor in the period of the holding frame. Therefore, the difference between the bias state of the driving transistor in the period of the holding frame and the bias state of the driving transistor in the period of the data writing frame is reduced, and thus the difference between the brightness rising rate of the light emitting element at the beginning of the period of the holding frame and the brightness rising rate of the light emitting element at the beginning of the period of the data writing frame is reduced, thereby improving the flicker phenomenon of the display image.

In an embodiment, as shown in FIG. 2, FIG. 7 or FIG. 10, the pixel circuit further includes a reset module 215 and a light-emission controlling module 214. The data writing module 211 is connected between the data signal input terminal Data and the source of the driving transistor Mn.

The compensation module 213 is connected between the gate of the driving transistor Mn and the drain of the driving transistor Mn. The reset module 215 is connected between the reset voltage input terminal Ref and the gate of the driving transistor Mn. The light-emission controlling module 214 includes a first light-emission controlling module 214*a* and a second light-emission controlling module 214*b*. The first light-emission controlling module 214*a* is connected between the first power supply terminal PV and the source of the driving transistor Mn, and the second light-emission controlling module 214*b* is connected between the drain of the driving transistor Mn and the light emitting element 31.

An embodiment of the present disclosure provides a method that can drive the display panel in the embodiment of FIG. 2. In the pixel circuit shown in FIG. 2, the reset control signal terminal Sr provides a first scanning signal, the first control signal terminal S1 provides a second scanning signal, the second control signal terminal S2 provides a third scanning signal, and the light-emission controlling signal terminal E provides a fourth scanning signal. The method can be understood in conjunction with the timing sequence diagram shown in FIG. 3. The method includes sequentially executing, by the pixel circuit, the reset phase T1, the data writing phase T2, and the light emitting phase T3 in the period Z1 of the data writing frame.

During the reset phase T1, the first scanning signal controls the reset module 215 to be turned on, the second scanning signal controls the data writing module 211 to be turned off, the third scanning signal controls the compensation module 213 to be turned off, and the fourth scanning signal controls the light-emission controlling module 214 to be turned off. In this phase, the gate of the driving transistor Mn is reset by the reset module 215.

During the data writing phase T2, the first scanning signal controls the reset module 215 to be turned off, the second scanning signal controls the data writing module 211 to be turned on, the third scanning signal controls the compensation module 213 to be turned on, and the fourth scanning signal controls the light-emission controlling module 214 to be turned off. In this phase, the data signal is written to the gate of the driving transistor Mn, and the shift of the threshold voltage of the driving transistor Mn is compensated.

During the light emitting phase T3, the first scanning signal controls the reset module 215 to be turned off, the second scanning signal controls the data writing module 211 to be turned off, the third scanning signal controls the compensation module 213 to be turned off, and the fourth scanning signal controls the light-emission controlling module 214 to be turned on. In this phase, the driving transistor Mn generates the driving transistor, and the light-emission controlling module 214 controls to provision of the driving current to the light emitting element.

The driving method further includes sequentially executing, by the pixel circuit, the reset and adjustment phase T4 and the light emitting phase T3 in period of the holding frame.

During the reset and adjustment phase T4, the first scanning signal controls the reset module 215 to be turned off, the second scanning signal controls the data writing module 211 to be turned on, the third scanning signal controls the compensation module 213 to be turned off, and the fourth scanning signal controls the light-emission controlling module 214 to be turned off. In this phase, the data writing module 211 is turned on and writes the adjusting voltage to the source of the driving transistor Mn so as to adjust the bias state of the driving transistor Mn.

During the light emitting phase, the first scanning signal controls the reset module 215 to be turned off, the second scanning signal controls the data writing module 211 to be turned off, the third scanning signal controls the compensation module 213 to be turned off, and the fourth scanning signal controls the light-emission controlling module 214 to be turned on. In this phase, the gate of the driving transistor Mn is maintained at the potential in the previous light emitting phase, and the driving transistor Mn generates the driving current under the control of this potential, and the light-emission controlling module 214 controls to provision of the driving current to the light emitting element.

In the method provided by the present embodiment, the data writing module is controlled to write the voltage signal to the source of the driving transistor during the data writing phase, and the data writing module is controlled to write the adjusting voltage to the source of the driving transistor during the reset and adjustment phase so as to adjust the bias state of the driving transistor. That is, the data writing module is reused in the data writing phase and the reset and adjustment phase. The flicker problem of the display images can be improved just by changing the driving timing sequence of the pixel circuit without changing the structure of the pixel circuit.

An embodiment of the present disclosure provides another method that can drive the display panel provided in the embodiments of FIG. 7 and FIG. 10.

Corresponding to the pixel circuit shown in FIG. 7, the data writing module includes a first sub-module and a second sub-module. The first sub-module is connected between the data signal input terminal Data and the source of the driving transistor Mn. The first sub-module comprises a second transistor M1*b*. A gate of the second transistor M1*b* is connected to the second control signal terminal S2, a first terminal of the second transistor M1*b* is connected to the data signal input terminal Data, and a second terminal of the second transistor M1*b* is connected to the source of the driving transistor Mn. The second sub-module is connected between the voltage adjusting signal input terminal $V_H$ and the source of the driving transistor Mn. The second sub-module includes a third transistor M1*c*. A gate of the third transistor M1*c* is connected to the third control signal terminal S3, a first terminal of the third transistor M1*c* is connected to the voltage adjusting signal input terminal $V_H$, and a second terminal of the third transistor M1*c* is connected to the source of the driving transistor Mn. In the pixel circuit shown in FIG. 7, the reset controlling signal terminal Sr provides the first scanning signal, the second control signal terminal S2 provides the second scanning signal, the third control signal terminal S3 provides the third scanning signal, and the light-emission controlling signal terminal E provides the fourth scanning signal.

Corresponding to the pixel circuit shown in FIG. 10, the data writing module includes a first sub-module and a second sub-module. The first sub-module is connected between the data signal input terminal Data and the source of the driving transistor Mn. The first sub-module comprises a second transistor M1*b*. A gate of the second transistor M1*b* is connected to the second control signal terminal S2, a first terminal of the second transistor M1*b* is connected to the data signal input terminal Data, and a second terminal of the second transistor M1*b* is connected to the source of the driving transistor Mn. The second sub-module is connected between the data signal input terminal Data and the source of the driving transistor Mn. The second sub-module includes a fourth transistor M1*d*. A gate of the fourth transistor M1*d* is connected to the fourth control signal terminal S4, a first terminal of the fourth transistor M1*d* is connected to the data signal input terminal Data, and a second terminal of the fourth transistor M1*d* is connected to the source of the driving transistor Mn. In the pixel circuit shown in FIG. 10, the reset controlling signal terminal Sr provides the first scanning signal, the second control signal terminal S2 provides the second scanning signal, the fourth control signal terminal S4 provides the third scanning signal, and the light-emission controlling signal terminal E provides the fourth scanning signal.

The method for driving the display panel provided in the embodiment of the present disclosure includes the following steps.

In the period Z1 of the data writing frame, the pixel circuit sequentially executes the reset phase T1, the data writing phase T2, and the light emitting phase T3.

During the reset phase T1, the first scanning signal controls the reset module 215 to be turned on, the second scanning signal controls the first sub-module (the second transistor M1*b*) to be turned off, the third control signal controls the second sub-module (the third transistor M1*c* in the embodiment of FIG. 7, or the fourth transistor M1*d* in the embodiment of FIG. 10) to be turned off, the second scanning signal controls the compensation module 213 to be turned off, and the fourth scanning signal controls the light-emission controlling module 214 to be turned off. In this phase, the gate of the driving transistor Mn is reset through the reset module 215.

During the data writing phase T2, the first scanning signal controls the reset module 215 to be turned off, the second scanning signal controls the first sub-module and the compensation module 213 to be turned on, the third scanning signal controls the second sub-module to be turned off, and the fourth scanning signal controls the light-emission controlling module 214 to be turned off. In this phase, the first sub-module and the compensation module are turned on at the same time, the data signal is written to the gate of the driving transistor Mn, and the shift of the threshold voltage of the driving transistor Mn is compensated.

During the light emitting phase T3 of the period Z1 of the data writing frame, the first scanning signal controls the reset module 215 to be turned off, the second scanning signal controls the first sub-module and the compensation module 213 to be turned off, the third scanning signal controls the second sub-module to be turned off, and the fourth scanning signal controls the light-emission controlling module 214 to be turned on. In this phase, the driving transistor Mn generates the driving current, and the light-emission controlling module 214 controls the provision of the driving current to the light emitting element.

In the period Z2 of the holding frame, the pixel circuit sequentially executes the reset and adjustment phase T4 and the light emitting phase T3.

During the reset and adjustment phase T4, the first scanning signal controls the reset module 215 to be turned off, the second scanning signal controls the first sub-module and the compensation module 213 to be turned off, the third scanning signal controls the second sub-module to be turned on, and the fourth scanning signal controls the light-emission controlling module 214 to be turned off. In this phase, the second sub-module is turned on, the adjusting voltage is written to the source of the driving transistor Mn so as to adjust the bias state of the driving transistor Mn.

During the light emitting phase T3 of the period Z2 of the holding frame, the first scanning signal controls the reset module 215 to be turned off, the second scanning signal controls the first sub-module and the compensation module 213 to be turned off, the third scanning signal controls the second sub-module to be turned off, and the fourth scanning signal controls the light-emission controlling module 214 to be turned on. In this phase, the gate of the driving transistor Mn is maintained at the potential in the previous light emitting phase, the driving transistor Mn generates the driving current under control of this potential, and the light-emission controlling module 214 controls the provision of the driving current to the light emitting element.

In the method for driving the display panel provided in this embodiment, the first sub-module in the data writing module is controlled to write the voltage signal to the source of the driving transistor in the data writing phase, the second sub-module in the data writing module is controlled to write the adjusting voltage to the source of the driving transistor in the reset and adjustment phase so as to adjust the bias state of the driving transistor. The first sub-module and the second sub-module are controlled by different control signals, and thus the compensation module and the first sub-module can be controlled by a common control signal, such that the compensation module and the first sub-module can be turned on simultaneously and turned off simultaneously.

When applied in a display panel, the first scanning signal, the second scanning signal, the third scanning signal, and the fourth scanning signal are respectively provided by different shift driving circuits. When the method provided by the embodiment of the present disclosure is applied, the display panel is provided with four groups of different shift driving circuits. Each shift driving circuit includes a plurality of cascaded shift registers.

Figure 14:
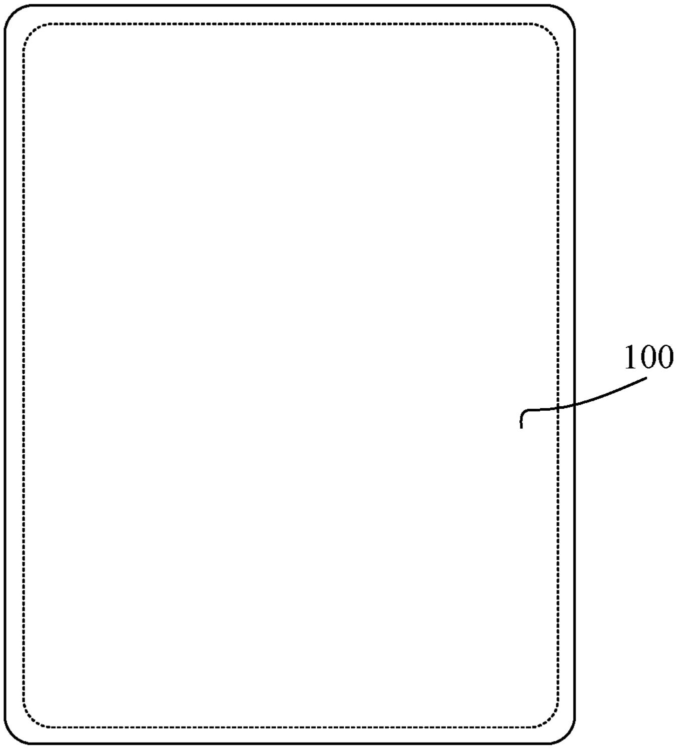
FIG. 14 is a schematic diagram of a display device according to an embodiment of the present disclosure.

An embodiment of the present disclosure further provides a display device. FIG. 14 is a schematic diagram of a display device according to an embodiment of the present disclosure. As shown in FIG. 14, the display device includes the display panel 100 in any one of the above embodiments of the present disclosure. The structure of the display panel 100 has been described in detail in the above embodiments, and is not repeated herein. The display device can be any electronic apparatus having a display function such as a mobile phone, a tablet computer, a notebook computer, an electronic paper book, a television, or a smart wearable product.

The above are merely some embodiments of the present disclosure, and are not intended to limit the present disclosure. Any modifications, equivalent substitutions or improvements made within the spirit and principles of the present disclosure shall be included in the protection scope of the present disclosure.

It should be noted that the above embodiments are only used to illustrate, but not to limit the technical solutions of the present disclosure. Although the present application is described in detail with reference to the foregoing embodiments, those skilled in the art shall understand that they can modify the technical solutions described in the foregoing embodiments, or equivalently replace some or all of the technical features. The modifications or replacements shall not direct the essence of the corresponding technical solutions away from the scope of the technical solutions of the embodiments of the present disclosure.

What is claimed is:

1. A display panel, comprising:

at least one pixel circuit; and a light emitting element, wherein one pixel circuit of the at least one pixel circuit comprises a driving transistor, a second transistor, and a third transistor, wherein the second transistor is connected between a data line and a source of the driving transistor, and the third transistor is connected between a voltage adjusting signal line and the source of the driving transistor;

wherein an operation process of the display panel comprises a data writing phase and a reset and adjustment phase;

wherein, during the data writing phase, the second transistor is turned on, the data line is configured to provide a data signal to the source of the driving transistor, the data signal is VData, a gate of the driving transistor is configured to receive the data signal, and a voltage of the gate of the driving transistor is VData+Vth, where Vth denotes a threshold voltage of the driving transistor;

wherein, during the reset and adjustment phase, the third transistor is turned on, the voltage adjusting signal line is configured to provide an adjusting voltage to the source of the driving transistor, a voltage of the source of the driving transistor is VJ, and the voltage of the gate of the driving transistor remains VData+Vth; and wherein $VData+Vth-VJ \leq -2V$.

2. The display panel according to claim 1, wherein $VJ \geq VD$, where VD denotes a maximum value of a voltage of the data signal.

3. The display panel according to claim 1, wherein $VData<6V$.

4. The display panel according to claim 1, wherein at beginning of the reset and adjustment phase, a voltage of the source of the driving transistor is Vs1, where $VJ>Vs1$.

5. The display panel according to claim 1, wherein the reset and adjustment phase is after the data writing phase.

6. The display panel according to claim 5, wherein the operation process of the display panel further comprises a period of a data writing frame and a period of a holding frame, wherein, during the period of the data writing frame, the one pixel circuit executes the data writing phase and a light emitting phase; and during the period of the holding frame, the one pixel circuit executes the reset and adjustment phase and the light emitting phase.

7. The display panel according to claim 1, wherein the one pixel circuit comprises a compensation module connected between the gate of the driving transistor and a drain of the driving transistor.

8. The display panel according to claim 7, wherein, during the data writing phase, both the second transistor and the compensation module are turned on; and during the reset and adjustment phase, the third transistor is turned on, and the compensation module is turned off.

9. The display panel according to claim 1, wherein the at least one pixel circuit comprises a plurality of pixel circuits, wherein the plurality of pixel circuits comprises the one pixel circuit and at least another one pixel circuit, wherein the at least another one pixel circuit each comprises another third transistor, wherein the third transistor of the one pixel circuit and the third transistor of the at least another one pixel circuit are connected to the voltage adjusting signal line.

10. A display panel, comprising:

at least one pixel circuit; and a light emitting element, wherein one pixel circuit of the at least one pixel circuit comprises a driving transistor, a second transistor, and a third transistor, wherein the second transistor is configured to provide a data signal to a source of the driving transistor, and the third transistor is configured to provide an adjusting voltage to the source of the driving transistor;

wherein an operation process of the display panel comprises a data writing phase and a reset and adjustment phase;

wherein during the data writing phase, the second transistor is turned on, the data signal is VData, a data line is configured to provide the data signal to the source of the driving transistor, a gate of the driving transistor is configured to receive the data signal, and a voltage of the gate of the driving transistor is VData+Vth, where Vth denotes a threshold voltage of the driving transistor;

wherein, during the reset and adjustment phase, the third transistor is turned on, a voltage adjusting signal line is configured to provide the adjusting voltage to the source of the driving transistor, the adjusting voltage is VJ, a voltage of the source of the driving transistor is VJ, and the voltage of the gate of the driving transistor remains VData+Vth; and wherein $VData+Vth-VJ \leq -2V$.

11. The display panel according to claim 10, wherein $VJ \geq VD$, where VD denotes a maximum value of a voltage of the data signal.

12. The display panel according to claim 10, wherein $VData<6V$.

13. The display panel according to claim 10, wherein at beginning of the reset and adjustment phase, a voltage of the source of the driving transistor is Vs1, where $VJ>Vs1$.

14. The display panel according to claim 10, wherein the reset and adjustment phase is after the data writing phase.

15. The display panel according to claim 14, wherein the operation process of the display panel further comprises a period of a data writing frame and a period of a holding frame, wherein during the period of the data writing frame, the one pixel circuit executes the data writing phase and a light emitting phase; and during the period of the holding frame, the one pixel circuit executes the reset and adjustment phase and the light emitting phase.

16. The display panel according to claim 10, wherein the one pixel circuit comprises a compensation module connected between the gate of the driving transistor and a drain of the driving transistor.

17. The display panel according to claim 16, wherein, during the data writing phase, both the second transistor and the compensation module are turned on; and during the reset and adjustment phase, the third transistor is turned on, and the compensation module is turned off.

18. The display panel according to claim 10, wherein the at least one pixel circuit comprises a plurality of pixel circuits, wherein the plurality of pixel circuits comprises the one pixel circuit and at least another one pixel circuit, wherein the at least another one pixel circuit each comprises another third transistor, wherein the third transistor of the one pixel circuit and the third transistor of the at least another one pixel circuit are connected to the voltage adjusting signal line.

19. A display device, comprising the display panel according to claim 10.

20. A display device, comprising a display panel, wherein the display panel comprises at least one pixel circuit and a light emitting element;

wherein one pixel circuit of the at least one pixel circuit comprises a driving transistor, a second transistor, and a third transistor, wherein the second transistor is connected between a data line and a source of the driving transistor, and the third transistor is connected between a voltage adjusting signal line and the source of the driving transistor;

wherein an operation process of the display panel comprises a data writing phase and a reset and adjustment phase;

wherein, during the data writing phase, the second transistor is turned on, the data line is configured to provide a data signal to the source of the driving transistor, the data signal is VData, a gate of the driving transistor is configured to receive the data signal, and a voltage of the gate of the driving transistor is VData+Vth, where Vth denotes a threshold voltage of the driving transistor;

wherein, during the reset and adjustment phase, the third transistor is turned on, the voltage adjusting signal line is configured to provide an adjusting voltage to the source of the driving transistor, a voltage of the source of the driving transistor is VJ, and the voltage of the gate of the driving transistor remains VData+Vth; and wherein $VData+Vth-VJ \leq -2V$.

* * * * *